US011713671B2

(12) United States Patent
    Moore

(10) Patent No.: US 11,713,671 B2
(45) Date of Patent: Aug. 1, 2023

(54) DOWNHOLE STATE-MACHINE-BASED MONITORING OF VIBRATION

(71) Applicant: HALLIBURTON ENERGY SERVICES, INC., Houston, TX (US)

(72) Inventor: James Wilson Moore, Casper, WY (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/513,937

(22) PCT Filed: Oct. 28, 2014

(86) PCT No.: PCT/US2014/062561
§ 371 (c)(1),
(2) Date: Mar. 23, 2017

(87) PCT Pub. No.: WO2016/068866
PCT Pub. Date: May 6, 2016

(65) Prior Publication Data
US 2017/0268324 A1    Sep. 21, 2017

(51) Int. Cl.
*E21B 44/00*  (2006.01)
*E21B 44/02*  (2006.01)
(Continued)

(52) U.S. Cl.
CPC .............. *E21B 47/12* (2013.01); *E21B 44/00* (2013.01); *E21B 44/02* (2013.01); *E21B 47/18* (2013.01); *E21B 49/003* (2013.01); *G01V 1/52* (2013.01)

(58) Field of Classification Search
CPC ................................. E21B 49/003; G01V 1/52
See application file for complete search history.

(56) References Cited

U.S. PATENT DOCUMENTS 4,949,045 A    8/1990  Clark et al.
6,021,377 A *  2/2000  Dubinsky ............... E21B 44/00
                                                         702/9
(Continued)

FOREIGN PATENT DOCUMENTS

EP    1867829    12/2007
EP    2169176    3/2010
(Continued)

OTHER PUBLICATIONS

Russell, S.J., Norvig, P. 2010. Artificial Intelligence: A Modern Approach. Pearson Education. Chapter 13 Quantifying Uncertainty (Year: 2010).*

(Continued)

*Primary Examiner* — Theodore N Yao
(74) *Attorney, Agent, or Firm* — Benjamin Ford; Parker Justiss, P.C.

(57) ABSTRACT

A disclosed vibration monitoring method includes: processing sensor information downhole to detect one or more vibration modes; responsively updating a vibration mode state machine; communicating a current machine state to an uphole module; deriving from said current machine state at least a primary vibration mode and associated severity; and modifying at least one drilling parameter if the severity exceeds a threshold. A disclosed drilling system implementation includes: a drill string; a rig or other deployment device that conveys the drill string into a borehole using at least one controllable drilling parameter; one or more downhole sensors providing vibration-related signals; a downhole processor that operates on the vibration-related signals to detect one or more vibration modes and responsively updates a vibration mode state machine; and an uphole module that receives the current state from the downhole (Continued)

processor and derives from the current state at least a primary vibration mode and severity.

19 Claims, 2 Drawing Sheets

(51) Int. Cl.
  *E21B 47/18* (2012.01)
  *E21B 49/00* (2006.01)
  *G01V 1/52* (2006.01)
  *E21B 47/12* (2012.01)

(56) References Cited

U.S. PATENT DOCUMENTS

| | | | |
|---|---|---|---|
| 6,302,203 | B1 | 10/2001 | Rayssiguier et al. |
| 6,684,952 | B2 | 2/2004 | Brockman et al. |
| 6,727,827 | B1 | 4/2004 | Edwards et al. |
| 6,732,052 | B2 | 5/2004 | MacDonald et al. |
| 7,172,037 | B2 | 2/2007 | Dashevskiy et al. |
| 7,181,370 | B2 | 2/2007 | Furem et al. |
| 7,357,196 | B2 | 4/2008 | Goldman et al. |
| 7,480,207 | B2 | 1/2009 | Marsh |
| 8,256,534 | B2 | 9/2012 | Byreddy et al. |
| 8,433,520 | B2 | 4/2013 | Ramshaw et al. |
| 8,589,136 | B2 | 11/2013 | Ertas et al. |
| 8,636,060 | B2 | 1/2014 | Hernandez |
| 8,672,055 | B2 | 3/2014 | Boone et al. |
| 2002/0005297 | A1* | 1/2002 | Alft .................. E21B 7/046 175/26 |
| 2005/0071120 | A1* | 3/2005 | Hutchinson ............ E21B 44/00 702/150 |
| 2008/0283240 | A1 | 11/2008 | Baaijens et al. |
| 2010/0051262 | A1 | 3/2010 | Dusterhoft et al. |
| 2010/0051270 | A1 | 3/2010 | Dusterhoft et al. |
| 2010/0051271 | A1 | 3/2010 | Gano et al. |
| 2011/0042096 | A1 | 2/2011 | Nutley et al. |
| 2012/0001776 | A1 | 1/2012 | Yu et al. |
| 2012/0017673 | A1 | 1/2012 | Godager |
| 2012/0024050 | A1 | 2/2012 | Godager |
| 2012/0130693 | A1 | 5/2012 | Ertas et al. |
| 2012/0222900 | A1 | 9/2012 | Rodney et al. |
| 2012/0290209 | A1 | 11/2012 | Mauldin et al. |
| 2012/0321209 | A1 | 12/2012 | Le et al. |
| 2013/0030706 | A1* | 1/2013 | Spencer ................ E21B 44/00 702/9 |
| 2013/0054203 | A1 | 2/2013 | Herbig et al. |
| 2013/0092439 | A1* | 4/2013 | Mauldin ............. E21B 44/005 175/40 |
| 2013/0106615 | A1 | 5/2013 | Prammer |
| 2013/0110402 | A1 | 5/2013 | Godager |
| 2013/0341091 | A1* | 12/2013 | Sugiura ................... E21B 7/04 175/24 |
| 2014/0129148 | A1 | 5/2014 | Harmer et al. |
| 2015/0160101 | A1* | 6/2015 | Gao ................... G01M 13/028 702/6 |
| 2016/0115778 | A1* | 4/2016 | van Oort ............ E21B 47/0006 175/27 |

FOREIGN PATENT DOCUMENTS

| | | |
|---|---|---|
| EP | 2628895 | 8/2013 |
| WO | 2009/058635 | 5/2009 |

OTHER PUBLICATIONS

Baumgartner, T., & van Oort, E. (Oct. 27, 2014). Pure and Coupled Drill String Vibration Pattern Recognition in High Frequency Downhole Data. Society of Petroleum Engineers. doi:10.2118/170955-MS (Year: 2014).*

PCT International Search Report and Written Opinion, dated Jul. 27, 2015, Appl No. PCT/US2014/062561, "Downhole State-Machine-Based Monitoring of Vibration," Filed Oct. 28, 2014, 14 pgs.

Simoes, et al., "A Comparative Study of Bayes Net, Naive Bayes and Averaged One-Dependence Estimators for Osteoporosis Analysis," Medinfo 2015: eHealth-enabled Health, 1 page.

* cited by examiner

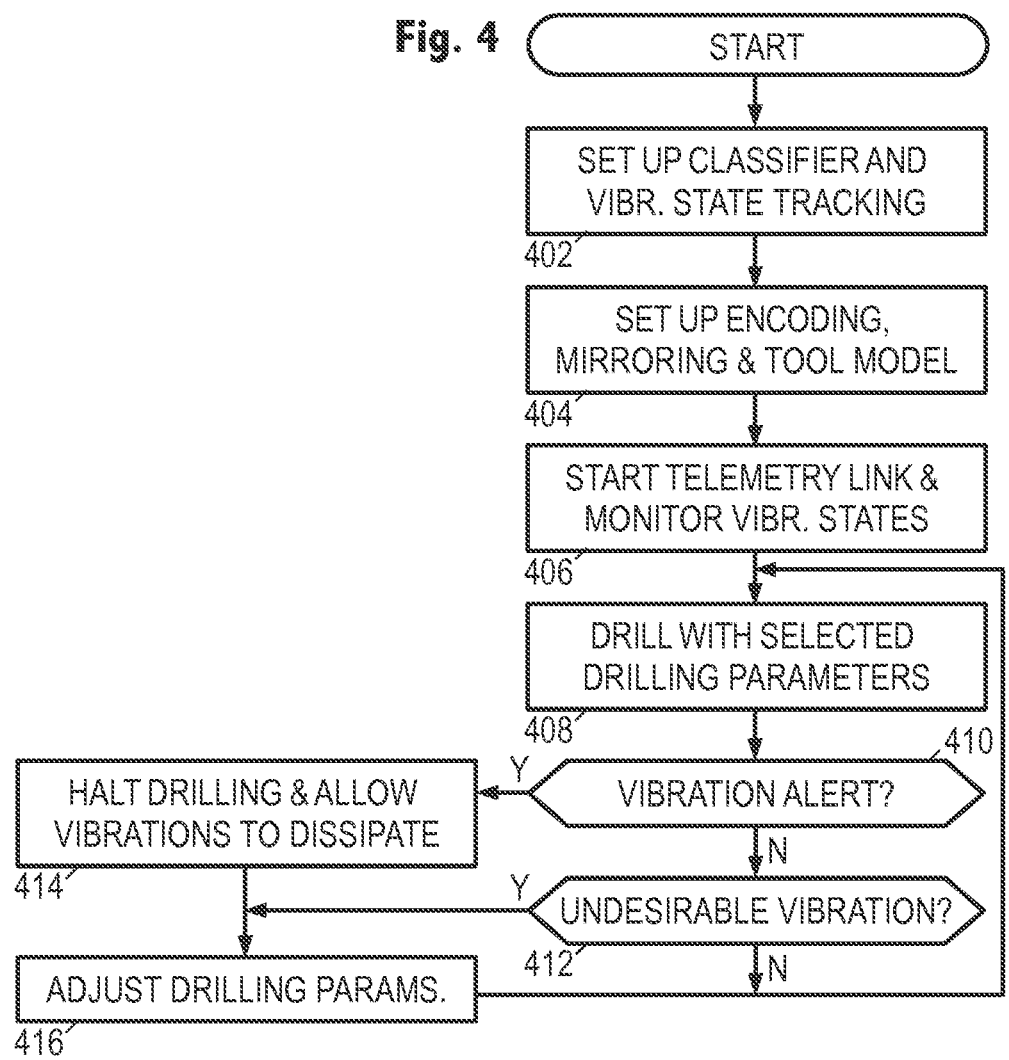

DOWNHOLE STATE-MACHINE-BASED MONITORING OF VIBRATION

BACKGROUND

Among the various costs incurred by reservoir discovery and development companies are Non-Productive Time (NPT) and Repair & Maintenance, each of which are driven at least in part by unmitigated vibrational energy in the drill string. Among the potential consequences of uncontrolled vibrational energy are Downhole Tool Failure, the (possibly multi-million dollar) cost of Lost-In-Hole drill strings, and the lost time (possibly on the order of days) spent jarring on Stuck-In-Hole drill strings.

Hence it is not surprising that those skilled in the art generally agree that vibration is a significant problem. Nevertheless, few Measurement While Drilling (MWD) field hands have the understanding necessary to identify and address drill string design issues to effectively mitigate vibration. Often, the root cause of poor drilling performance remains unknown until the drill string is retrieved to the surface for inspection. In part, this mystery is attributable to the issues associated with communication between downhole drilling equipment and surface computer systems.

Existing telemetry methods include 1) mud pulse, 2) electrical pulse, and 3) wired pipe. Mud pulse telemetry, for example, is known to be reliable in extended reach wells and relatively low cost. Mud pulse is also known to have very low data communication rates: much too low for full resolution vibration data. (The amount of vibration data needed to satisfy the Nyquist frequency criterion in dynamically changing drilling environments is much too large.) The other telemetry systems each have their advantages and disadvantages, but at the end of the day mud pulse telemetry remains the cheapest and most reliable method in extended reach wells and hence continues to be a preferred choice even in the face of its severe bandwidth limitations.

This information bottleneck means that a great deal happens downhole which cannot be monitored in real time. One popular workaround involves storing as much information as possible downhole and communicating or physically transporting the stored information long after it was acquired. Of course, in addition to the undesirable delay associated with this option, the finite size of drilling-environment-tolerant memory modules inevitably causes most such information to be discarded or lost. Conventional compression techniques are of limited assistance.

Ultimately, priorities are assigned and choices made, yielding little-to-no bandwidth availability for true vibration monitoring, despite the evidence that the lack of such monitoring in long, deep boreholes leads to a high rate of downhole tool failures whose precise causes are frequently indeterminate in real-time.

Despite its apparent inadequacy, the standard industry solution is statistical characterization of the downhole vibrations, e.g., root mean square acceleration, maximum and median shock amplitudes, which statistics are recorded and/or communicated to the surface in place of the vibration signal itself. One proposed alternative is to record a full-resolution vibration signal over a small time window, compress, and transmit it slowly after the fact. This proposed alternative has been deprecated due to its excessive bandwidth requirements.

BRIEF DESCRIPTION OF THE DRAWINGS

Accordingly, there are disclosed herein downhole state-machine-based vibration monitoring methods and systems. In the drawings:

FIG. 4 is a flow diagram of an illustrative vibration monitoring method.

Figure 1:
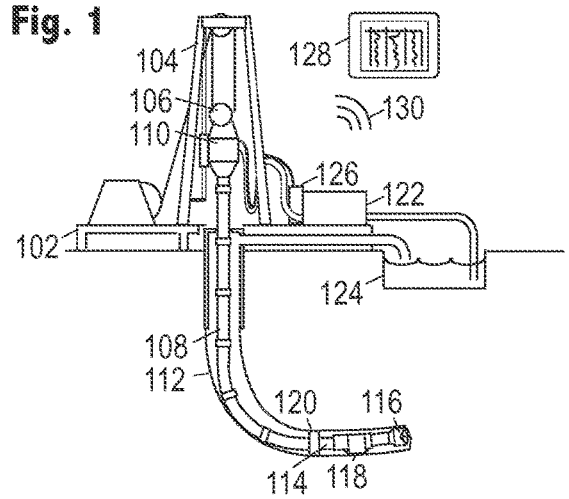
FIG. 1 is a schematic view of an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

To provide context for the ensuing vibration monitoring discussion, an illustrative drilling environment is shown in FIG. 1. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As the drill bit 116 rotates, it extends the borehole 112 in a directed manner through various subsurface formations. The illustrated downhole assembly 114 includes an oriented mud motor with a bent housing. (Another common type of drilling system is the rotary steerable system (RSS) or motor assisted rotary steerable system.) Oriented mud motors allow drilling teams to steer the wellbore to follow the desired well path as defined in the well plan. A pump 122 circulates drilling fluid through a feed pipe to the top drive 110, downhole through the interior of drill string 108, through nozzle orifices in drill bit 116, back to the surface via the annulus around drill string 108, and into a retention pit 124. Among other things, the drilling fluid cools the bit, transports cuttings from the borehole into the retention pit 124 and aids in maintaining the borehole integrity.

The drill bit 116 and downhole motor assembly 114 or rotary steerable system (RSS) 118 form just one portion of a typical bottom-hole assembly. A typical list of bottom-hole-assembly components may include of the following elements: drill pipe, heavy weight drill pipe, drill collars, heavy weight drill collars, agitators, exciters, jars, stabilizers, reamers, hole openers, filter subs, circulation subs, monels or non-magnetic drill collars, crossovers, an oriented mud motor with a bent housing 114, and the drill bit 116. The selection, combination, and order of commercially available equipment are designed by the directional driller and drilling engineer to optimize drilling and cost. Bottom-hole-assemblies are assembled to the proper connection torque on the drilling "rig floor" from parts that are relatively short compared to the Measured Depth of the well. Note that some BHA's do not include an oriented mud motor for sliding. These comprise rotary steerable assemblies that are not assisted by a mud motor, and various "dumb iron" assemblies. Some of these non-magnetic monel drill collars include built-in or rig-site mounted logging instruments to gather measurements comprising vibration data, surveying and magnetic data, formation evaluation measurements, et cetera. Surface data logging systems collect and record data such as block position, hole depth, bit depth, weight-on-bit, torque, and standpipe pressure.

Among the logging instruments there may be included sensors having measurements sensitive to vibration, e.g., accelerometers, gyroscopes, geophones, and inertial sensors.

Among the specific embodiments contemplated below are BHAs including tri-axial accelerometers to measure acceleration along X-, Y-, and Z-axes, or more preferably, axial, radial, and circumferential acceleration. A downhole controller acquires the various sensor measurements, and after optional processing, stores the measurements in a fashion that associates the measurements with acquisition time, tool position, and tool orientation, enabling the time and space dependence of the measurements to be determined. In addition to being stored in internal memory, some subset or representation of the measurements is communicated to an uphole module 126.

A telemetry module is typically included in the BHA to maintain a communication link with the surface sensor(s) and demodulation system 126. Mud pulse telemetry is one common telemetry technique for transferring tool measurements to the uphole module 126 and to receive commands from the surface system, but other telemetry techniques can also be used. Typical telemetry data rates may vary from less than one bit per minute to several bits per second, usually far below the necessary bandwidth to communicate all of the raw measurement data to the uphole module. Even a highly-compressed, minimal rate, minimal resolution multi-axial vibration measurement could be expected to require nearly 100 bits per second for real time communication, consuming all available telemetry bandwidth in even the best of circumstances.

The uphole module 126 may be further coupled to various sensors on and around the drilling platform to obtain measurements of drilling parameters from the surface equipment; parameters such as hook load, rate of penetration, surface torque, revolutions per minute (RPM) of the surface drill string, drilling fluid flow rate, and standpipe pressure or differential pressure between internal pipe and annulus. The uphole module 126 may include a processing unit, or as shown in FIG. 1, it may serve as a surface interface that communicates with a separate processing unit 128. The processing unit can take alternative forms, including a desktop computer, a laptop computer, an embedded processor, a cloud computer, a central processing center accessible via the internet/intranet, and combinations of the foregoing.

The processing unit 128, shown as a tablet computer in FIG. 1, communicates with the uphole module 126 via a wired or wireless network communications link 130, and provides a graphical user interface (GUI) or other form of interactive interface that enables a user to provide commands and to receive (and optionally interact with) a visual representation of the acquired measurements. At least some of the measurements may be in log form, e.g., a graph of the borehole trajectory and/or measured parameters as a function of time and/or position along the borehole. Of particular interest to the present disclosure is the ability of the processing unit 128 to represent detected vibration modes and severities and thereby enable the user to adjust drilling parameters as needed to optimize performance.

In addition to the uphole and downhole drilling parameters and measured formation parameters, the uphole module 126 or processing unit 128 may be further programmed with additional parameters regarding the drilling process, which may be entered manually or retrieved from a configuration file. Such additional parameters may include, for example, the specifications for the drill string and BHA, including drilling tubular and collar materials and dimensions, stabilizer diameters and positions, and bit design parameters. The additional information may further include a desired borehole trajectory and expected formation types along that trajectory. Experiences and logs from offset wells may also be included as part of the additional information.

Figure 2:
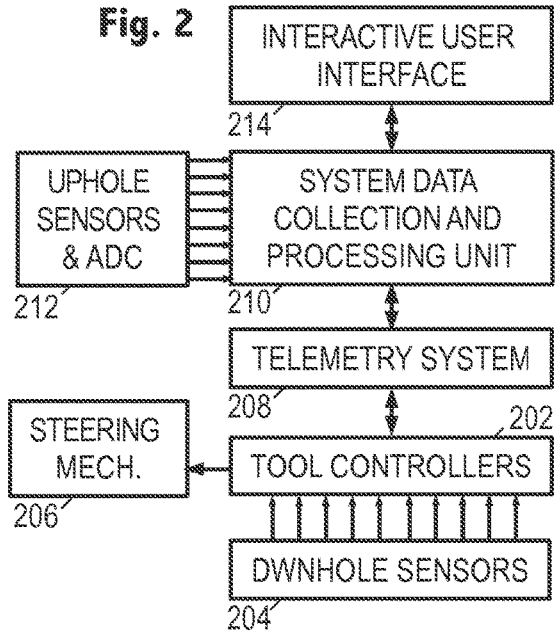
FIG. 2 is a block diagram of an illustrative drilling system.

FIG. 2 shows an illustrative drilling system as a function-block diagram. One or more downhole tool controllers 202 collect measurements from a set of downhole sensors 204, including at least measurements from vibration-sensitive sensors but preferably also including measurements from sensors for other drilling parameters (e.g., downhole weight on bit, downhole torque, downhole bending moment) and formation parameters (e.g., density, resistivity). The downhole controller(s) 202 may digitize and store the measurements, with optional downhole processing to compress the data, improve the signal to noise ratio, and/or to derive parameters of interest from the measurements.

A telemetry system 208 conveys at least some of the measurements or derived parameters to an uphole module and/or processing unit at the surface (shown in FIG. 2 as processing system 210). Processing system 210 collects, records, and processes the telemetry information from downhole as well as measurements from a set of sensors 212 on and around the rig. Processing system 210 generates a display of the relevant information on interactive interface 214, e.g., measurement logs, borehole trajectory, or extracted values such as vibration mode and severity, or current state of a vibrational model state machine. The interactive interface 214 may further include a set of feasible recommended corrective measures if an undesirable level of vibration is detected. The processing system 210 may further accept user inputs and commands and operate in response to such inputs to, e.g., transmit commands and configuration information via telemetry system 208 to the downhole processor 206. Such commands may alter the settings of the steering mechanism 206, e.g., reducing RSS bend angle or increasing stabilizer diameters to counteract BHA whirl.

Figure 3:
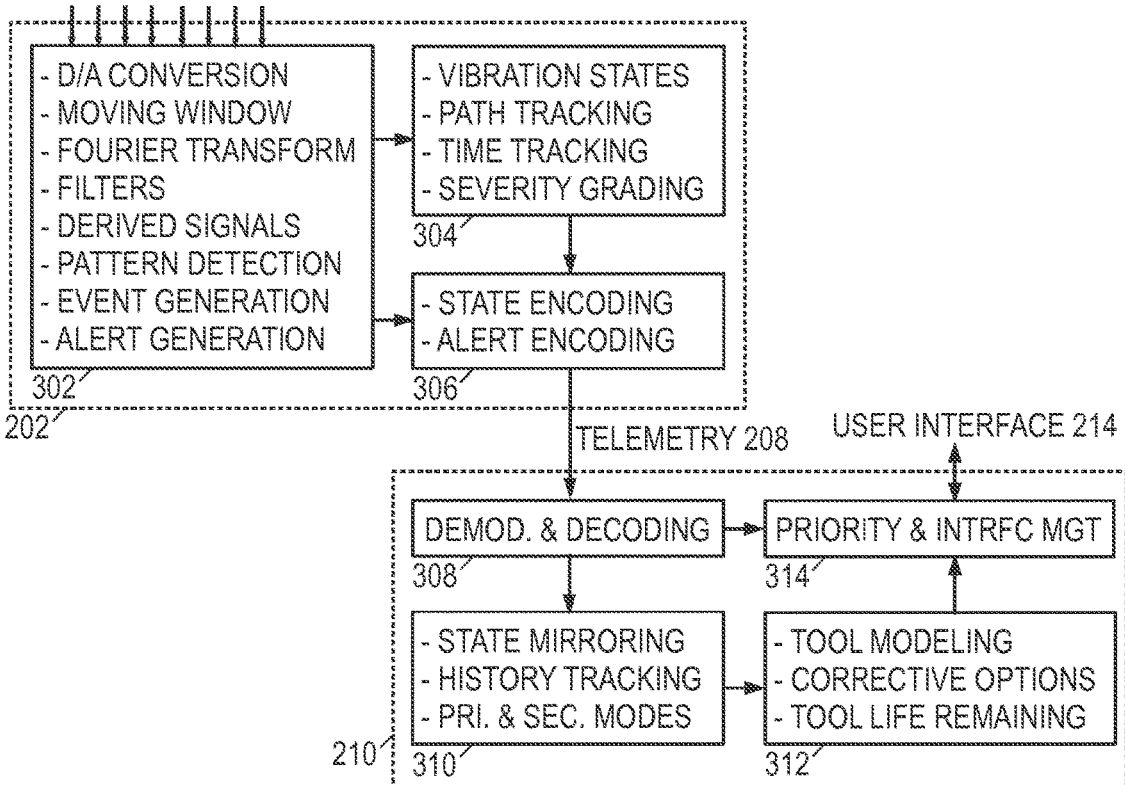
FIG. 3 is a block diagram of an illustrative vibration monitoring system.

FIG. 3 shows a number of functional blocks for implementing an illustrative vibration monitoring system and, by reference to blocks from FIG. 2, a suitable configuration for the implementation of the functional blocks. Thus, for example, a tool controller 202 is shown having three processes 302, 304, 306, and processing system 210 is shown having four processes 308, 310, 312, 314, which are each described in turn below. These processes may be implemented purely as hardware (e.g., application specific integrated circuit (ASIC) modules); as software modules executing on one or more general purpose processors; or as a hybrid (e.g., a field-programmable gate array (FPGA)). Where software is relied on, it may be embedded in a non-transitory information storage medium that is operably coupled to the relevant processing hardware.

Downhole tool controller 202 is shown having processes for implementing a finite state machine (FSM) for detecting and monitoring various vibration modes. This FSM is hereafter termed a "vibration mode state machine". A data collection process 302 obtains the digitized sensor measurement signals from, e.g., a tri-axial accelerometer and performs filtering and other forms of pre-processing to detect vibration and classify the vibration into one of several modes. Other sensor inputs may include rotations per minute (RPM) as measured by Hall sensors, downhole torque or downhole torsional strain, and downhole weight on bit.

Such pre-processing may include windowing the signals to, e.g., discard any measurements older than a given window length. Illustrative window lengths may be less than 0.5, 1, 2, 4, 8, 15, or 30 seconds. The remaining measurements may be transformed into a frequency domain spectrum by way of a fast Fourier transform, and filters may be applied by pairwise multiplication with the frequency components of the resulting spectrum. One such filter may be equivalent to taking a time derivative of each acceleration signal, which time derivative is commonly termed the "jerk" signal. (Alternatively, the jerk signal may be derived by taking a time derivative, with a later transform if the frequency spectrum is desired.)

For frequency-specific information about the acceleration and/or jerk signals, individual components of the spectra may be selected. To estimate energy over a broader frequency band, a weighted sum of squared magnitudes of selected frequency components may be determined.

As an example of another way to identify features in the acceleration and/or jerk signals or spectra, data collection process 302 may perform template-matching evaluations. A spectrum or windowed signal (with optional normalization) may be compared to any given template using a mean-square-error calculation, an inner product calculation, a similarity calculation, or a cross-correlation peak calculation.

The frequency component, band energy, and/or template matching values may be kept as raw ("fuzzy") values or compared to respective thresholds to produce binary flags indicating the presence or absence of each feature represented by the calculation. The data collection process 302 may then operate on the values or flags to detect the presence of various vibration modes.

Illustrative vibration modes include stick-slip, bit bounce, bit whirl (forward), bit whirl (backward), BHA whirl (forward), BHA whirl (backward), lateral shocks, torsional resonance, parametric resonance, and bit chatter. The stick-slip vibration mode represents a non-uniform drill string rotation caused by momentary halting of the bit (or drill string) at regular intervals, forcing the drill string to periodically torque up and then spin free. In many cases, this vibration mode features a magnified frequency component in the 0.1 to 5 Hz range of the circumferential acceleration and/or circumferential jerk signal, and is generally correctable by increasing RPM and/or decreasing WOB.

The bit bounce vibration mode represents oscillation of the bit along the longitudinal axis of the drill string, characteristic of repeated impacts with the hole bottom, and it can quickly escalate into other vibration modes. In many cases, this vibration mode features a strong axial acceleration or jerk signal frequency component in the 1 to 10 Hz range, and is generally correctable by decreasing RPM and/or increasing WOB.

The bit whirl vibration modes represent bit motion around the hole circumference (as opposed to simple rotation about the natural bit axis). Bit motion around the circumference in the direction of bit rotation is "forward" whirl, while motion in the opposite direction is "backward" whirl. In many cases, these vibration modes feature a strong frequency component in the 10 to 50 Hz range of both the radial and circumferential components of the acceleration and/or jerk signals. Generally, correction may involve altering the RPM, preferably downward, with increased WOB.

The BHA whirl vibration modes are similar to the bit whirl modes, except that it is the drill collar assembly that tracks around the borehole circumference with (forward) or opposite (backward) the rotation of the drill string. Uncorrected BHA whirl is believed to be the most common cause of failure-inducing shocks to downhole tools. These vibration modes may be expected to feature a highly-elevated (i.e., greater than might be expected for bit whirl) frequency component in the 5 to 20 Hz range of both the radial and circumferential components of acceleration and/or jerk, and may further feature a harmonic periodicity in other downhole instrument measurements including, e.g., magnetometer-based orientation measurements. As with bit whirl, correction may involve reducing RPM and/or increasing WOB.

The lateral shock vibration mode represents frequent, but often irregular, impacts against the borehole wall, often leading to increased mean torque, possibly coupled with cyclic torque and RPM variations. As no typical frequency range has been observed, the predominant feature may be a high incidence rate of radial acceleration and/or radial jerk excursions above a predetermined threshold. Correction may involve reducing RPM.

The torsional resonance mode represents torsional excitation of a resonant frequency of the BHA, possibly caused by individual cutter impacts or excessive, localized side forces. A feature of this vibration mode is elevated circumferential acceleration and/or jerk signal components in the 20 to 350 Hz range, and it can be corrected by altering the RPM up or down to reduce coupling with the torsional resonance frequency.

The parametric resonance mode represents axial excitation of a resonant frequency of the BHA, general as a result of the bit's interactions with the formation. In many cases, this vibration mode features an elevated component in the 0.1 to 10 Hz frequency range of the axial and radial acceleration and/or jerk signals. Correction may involve decreasing RPM and/or increasing WOB.

The bit chatter vibration mode is representative of relatively-high frequency axial resonance of the bit and BHA, typically caused by slightly eccentric bit rotation causing the cutters to ride up and down over the pattern of cuts on the hole bottom. It often occurs as a prologue for the bit whirl vibration mode. In many cases, this vibration mode features an elevated component in the 20 to 250 Hz frequency range of the circumferential and radial acceleration or jerk signals. Correction may involve altering the RPM up or down, or in some circumstances by adjusting the WOB up or down.

Additionally, it is noted here that many of these vibration modes can coexist and in at least some cases the modes may be coupled, enabling energy from one vibration mode to excite another vibration mode. Furthermore, when modes of vibration interact, they may interact at harmonics of dominate frequencies. When vibration is observed at a non-obvious frequency, harmonics of other modes need to be investigated. The appropriate corrective action often depends on a correct identification of the initiating (primary) mode as opposed to the excited (secondary/tertiary) mode(s).

Given the foregoing catalog of vibration modes, the collection process 302 may operate on feature values extracted from the acceleration and/or jerk signals, using a naïve Bayes classification to detect the presence or absence of each vibration mode independent of the rest, and may associate with each present vibration mode a severity level (e.g., low, medium, or high) by comparison of various thresholds to an energy level associated with the relevant vibration mode features within the window. Some alternative implementations may process the multi-axial acceleration and jerk signals with other pattern detection/classification strategies to detect the various vibration modes and an associated severity level.

Upon processing the signal measurement data within a given window and detecting the presence of one or more vibration modes, collection process 302 generates a detection event and passes to monitoring process 304 an identification of detected vibration modes and their associated severities. If any of the vibration mode severities is so elevated as to present an imminent threat of failure, the collection process 302 generates an alert event and passes the relevant information to encoding process 306. The collection process 302 then repeats the processing operations described above for the next window, which preferably includes a significant overlap of the previous window. Where processor resources are limited, the overlap may be reduced or eliminated.

Monitoring process 304 maintains and updates a vibration mode state machine based on the events received from the collection process and (optionally) based on a timer. Though a variety of state machine designs are suitable, one illustrative embodiment is described here for the sake of completeness. In the illustrative embodiment, monitoring process 304 maintains one state for each of the vibration modes that may be identified by the collection process 302, e.g., stick-slip, bit bounce, bit whirl (forward), bit whirl (backward), BHA whirl (forward), BHA whirl (backward), lateral shocks, torsional resonance, parametric resonance, and bit chatter. The states need not be exclusive, and it is contemplated that multiple vibration modes (and their corresponding states) may be concurrently active.

Each state may further be associated with a residence time, a severity level (possibly in the form of a simple ranking), and a path. The residence time may be a counter or other indication of the time that this state has been active. The severity level is an indication of the dominance, relative energy, or actual measured energy associated with features relevant to that state. (Relative energy is normalized by total energy associated with all vibration modes, whereas dominance may be an empirical measure of the vibration mode's relative importance relative to other vibration modes, accounting for other factors such as momentum transfer, average impact energy, and residence time.) The vibration mode having the highest severity level is hereafter termed a "primary" vibration mode, while the second-highest severity level is termed a "secondary" vibration mode.

The path is an indication of the state(s) of the vibration mode state machine before this state became active, and potentially includes an indication of the ensuing state(s) when the state becomes inactive. As described further below, the state of the vibration mode state machine at any given time (including a current state, a preceding state, and an ensuing state) can be represented by a binary word having bits to indicate which states are active and fields for the associated residence time, severity, and path information of each state. The path information is preferably formed from an abbreviated representation of this state representation. In one specific embodiment, the abbreviated representation of a given state is a numeric identifier of the primary vibration mode (or a zero, if no vibration modes are active). Thus, for example, the path information associated with an active state may include the numeric identifier for the primary vibration mode when the state became active, and a numeric identifier of the primary vibration mode at the time that preceding state became active. For an inactive state, the path information may be supplemented by an identifier for the primary vibration mode at the time the state became inactive. In this manner, the progression of states can be tracked. In some cases, the abbreviated representation may further include a numeric identifier for the secondary vibration mode.

The monitoring process 304 examines the event information from each window and updates the vibration mode state machine. In some embodiments, the monitoring process 304 activates a state if it is detected in at least two out of five previous windows. Upon activating a state, the monitoring process updates the associated path information based on the primary vibration mode at the time and the path information associated with the state representing that primary vibration mode. The monitoring process 304 further resets a residence timer for the newly activated state, then updates the severity level and residence time counters for each active state. Conversely, if less than two detections of a given mode were made in the last five windows, the monitoring process 304 deactivates the associated state, supplements the path information based on the current primary vibration mode, and freezes the residence timer.

Periodically, or alternatively with each activation and deactivation of a state, encoding process 306 transmits an event message to the uphole module to indicate the current status of the vibration mode state machine. In response to any alert message from the collection process 302, the encoding process transmits an alert message to the uphole module. The alert message may include the detected vibration mode(s) and the severity level associate with each. The more common event messages provide an abbreviated representation of the vibration state machine, preferably including an indication of the active/inactive nature for each state and possibly including an indication of the primary vibration mode and a severity level associated therewith. Optionally, path information associated with the primary vibration mode may be included and/or an indication of the secondary vibration mode, severity level, and path information associated therewith. As an alternative, severity levels associated with each active state may be sent to the uphole module.

In any event, the chosen message communication strategy preferably minimizes the required bandwidth for communicating the alert and event messages to the uphole module, e.g. variable length encoding, in addition to the savings that accrues by the use of vibration mode state machine messages in lieu of sending full resolution vibration signals.

In the processing system 210, a decoding process 308 demodulates and decodes the alert and event messages to extract the communicated information. The decoding process 308 provides alert message information to an interface management process 314 for immediate display to a user. The decoding process 308 further provides the information from event and alert messages to a mirroring process 310.

Based on the event and alert message information, the mirroring process 310 reconstructs a current state of the downhole vibration mode state machine, preferably determining at least the primary and secondary vibration modes and the severity levels associated therewith. In a more preferred implementation, the mirroring process determines whether each of the vibration modes is active or inactive, the path information associated with each state, and for the active states, the associated severity level and residence times.

The mirroring process 310 may further track such information as a function of time and use this history (or simply a history of the event and alert messages) as a basis for reconstructing the implicit information which would then not need to be specifically communicated via event message. Examples of implicit information may include the path information, residence times, and identification of primary and secondary vibration modes. Where the telemetry channels are not sufficiently reliable, possibly causing messages to be lost, it may be necessary to send such information explicitly. Even when reliable communications are available, the messages (and hence the updates to the mirrored vibration mode state machine) may occur slowly, e.g., happening every 0.5 to 5 minutes.

Based on the current state of the mirrored vibration mode state machine, possibly in combination with design information about the BHA and measurements from the uphole sensors 212, a modeling process 312 models the tool behavior, potentially estimating such parameters as vibration amplitudes, joint stresses, component fatigue, remaining tool life, predicted failure modes, and estimated failure probabilities. Based on the modeled behavior under current and alternative drilling conditions, modeling process 312 may determine whether a change to the drilling conditions is recommended and what that change should be. Among the recommendations that may be illustratively generated by the modeling process are: increases or decreases to rotational speed, increases or decreases to hook load, increases or decreases to fluid flow rate or pressure, momentary halting of drilling to dissipate vibrational energy, and replacement of the bit or other BHA components.

The BHA design information relied upon by the modeling process may include bit type, bit size, bit configuration, the number of bit blades, the number and position of stabilizers, the configuration of the stabilizer blades, the configuration of the steering mechanism, as well as the configuration of drill collars and present length of the drill string. In some implementations, the modeling process may further account for borehole curvature, tortuosity, and BHA inclination.

Interface management process 314 generates a representation of the active downhole vibration mode(s) and/or an indication of the tool behavior derived from the vibration mode state machine information and displays it on user interface 214, potentially including recommended corrective actions if undesirable vibration levels are detected. For unacceptable vibration levels, such as those indicated by alert messages, the interface management process 314 generates an alarm on the user interface 214, enabling the user to take corrective measures without undue delay. For more advanced analysis, the interface management process may further display path information associated with each vibration mode, enabling a user to observe the context in which a vibration mode becomes active and dissipates.

FIG. 4 is a flow diagram of an illustrative vibration monitoring method. It begins with setting up the BHA in block 402, assembling it and programming the tool controller(s) with the above-described collection process (including a vibration mode detector and classifier) and monitoring process, which maintains the vibration mode state machine.

In block 404, the encoding process is programmed to operate within the constraints of the telemetry module, e.g., by setting an appropriate message period (which may lead to modification of the measurement window size/overlap) and suitably abbreviated representation of the vibration mode state machine. The uphole module is also programmed with suitable decoding, monitoring, and modeling processes.

In block 406, the BHA is deployed in the borehole and the vibration monitoring is initiated. The downhole tool controller begins maintaining a vibration mode state machine and communicating telemetry messages to the uphole module, which in turn mirrors the vibration mode state machine and generates a displayed representation that a user can use to monitor the downhole vibration information and determine what, if any, corrective actions should be taken.

In block 408, the user initiates the drilling process, increasing flow rate, weight on bit, and rotation speed to extend the borehole. As the drilling progresses, the system checks in block 410 for alert events and in block 412 for indications of undesirable vibration levels in the BHA. If an alert event is detected, the system recommends corrective action which, initially, may include an immediate drilling halt to permit the vibrational energy to dissipate. After such dissipation, or merely in response to a detection of undesired vibration modes, the system in block 416 recommends an adjustment to the drilling parameters (e.g., hook load, rotation rate, flow pressure) to mitigate the undesired vibration. Blocks 408-416 are repeated as necessary for as long as the drilling process continues.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

For completeness, certain embodiments and feature combinations are summarized below. These include: Embodiment A—A vibration monitoring method that comprises: processing sensor information downhole to detect one or more vibration modes; updating a current state of a vibration mode state machine based at least on part on any detected vibration modes; communicating a representation of said current state to an uphole module; deriving from said representation a primary vibration mode and severity; and modifying at least one drilling parameter if the severity exceeds a threshold. Embodiment B—A drilling system that comprises: a drill string having a bit for extending a borehole; a rig or other deployment device that conveys the drill string into a borehole using at least one controllable drilling parameter; one or more downhole sensors coupled to the drill string and providing vibration-related signals; a downhole processor that operates on the vibration-related signals to detect one or more vibration modes and responsively updates a current state of a vibration mode state machine; and an uphole module coupled to the rig or other deployment device, wherein the uphole module receives representations of the current state from the downhole processor and derives from the representations at least a primary vibration mode and severity.

Each of the foregoing embodiments can have any one or more of the following features alone or in any combination: Feature 1—the deriving includes tracking a history of said current state and analyzing said history. Feature 2—the current state includes path information. Feature 3—the representation includes a severity for each of multiple vibration modes. Feature 4—the representation designates a primary vibration mode and a secondary vibration mode. Feature 5—the sensor information includes multi-axial acceleration sampled at 10 Hz or higher. Feature 6—the processing includes deriving a multi-axial jerk signal from multi-axial acceleration measurements. Feature 7—the processing includes subjecting at least the multi-axial jerk signal and multi-axial acceleration signal to naïve-Bayes classification to detect a plurality of vibration modes. Feature 8—the processing includes detecting vibration modes from a set that includes stick-slip, bit bounce, bit whirl, bottomhole assembly (BHA) whirl, lateral shocks, torsional resonance, parametric resonance, and bit chatter. Feature 9—the vibration mode state machine includes at least one state for each of the multiple vibration modes in the foregoing set. Feature 10—the method further includes tracking an amount of time spent in each state of the vibration mode state machine; and communicating said amounts to the uphole module. Feature 11—the uphole module determines an adjustment to the at least one controllable drilling parameter based at least in part on the primary vibration mode and severity. Feature 12—the at least one controllable drilling parameter comprises: a weight on bit, and a bit rotation rate, a drill string rotation rate, a torque, a rate of penetration, a flow rate, and a differential pressure.

What is claimed is:

1. A vibration monitoring method that comprises:
processing sensor information downhole to detect one or more vibration modes;
updating a current state of a vibration mode state machine downhole based at least on part on any of the one or more detected vibration modes, wherein a residence time, severity level, and path information are associated with the current state of the downhole vibration mode state machine, the residence time is a counter or indication of the time the current state has been active;
communicating a representation of the current state of the downhole vibration mode state machine to an uphole module with employment of mud pulse telemetry;
reconstructing, by the uphole module, the current state of the downhole vibration mode state machine from the representation of the current state of the downhole vibration mode state machine to determine a primary vibration mode and severity thereof;
modifying at least one drilling parameter of a drill string situated downhole based on the reconstructed current state of the downhole vibration mode state machine by the uphole module, wherein:
the processing occurs downhole in a downhole tool controller and employs a naïve-Bayes classification to detect a presence or absence of each of the one or more vibration modes independent of any others of the one or more vibration modes if there are any other vibration modes of the one or more vibration modes, and
each of the classification of vibration modes of the naïve-Bayes classification are pre-programmed before employing the naïve-Bayes classification.

2. The method of claim 1, wherein the uphole module tracks a history of the current state of the downhole vibration mode state machine and analyzes the history.

3. The method of claim 2, wherein:
the representation of the current state of the downhole vibration mode state machine has an associated first indicia of the primary vibration mode corresponding to when the current state of the downhole vibration mode state machine became active, and
the representation of the current state of the downhole vibration mode state machine has an associated second indicia of the primary vibration mode corresponding to a time when an immediately preceding state of the downhole vibration mode state machine occurred.

4. The method of claim 3, wherein the representation of the current state of the downhole vibration mode state machine designates both the primary vibration mode and a secondary vibration mode.

5. The method of claim 1, wherein the representation of the current state of the downhole vibration mode state machine includes a severity for each of multiple vibration modes of the one or more vibration modes.

6. The method of claim 1, wherein the sensor information includes multi-axial acceleration sampled at 10 Hz or higher.

7. The method of claim 6, wherein the processing includes deriving a multi-axial jerk signal from the multi-axial acceleration.

8. The method of claim 1, wherein the processing includes detecting the one or more vibration modes from a set that includes stick-slip, bit bounce, bit whirl, bottomhole assembly (BHA) whirl, lateral shocks, torsional resonance, parametric resonance, and bit chatter.

9. The method of claim 8, wherein the vibration mode state machine includes at least one state for each of the vibration modes in the set.

10. The method of claim 1, further comprising tracking an amount of time spent in each state of the vibration mode state machine and communicating the amounts to the uphole module.

11. The vibration monitoring method of claim 1, wherein:
the sensor information includes multi-axial acceleration signals, and
the processing includes deriving a multi-axial jerk signal from the multi-axial acceleration signals and using the naïve Bayes classification to detect the presence or absence of the one or more vibration modes independent of other vibration modes.

12. A drilling system that comprises:
a drill string having a bit for extending a borehole;
a rig that conveys the drill string into the borehole using at least one controllable drilling parameter;
one or more downhole sensors coupled to the drill string and providing vibration-related signals;
a downhole processor in a downhole tool controller that:
operates on axial acceleration signals of the vibration-related signals,
employs naïve-Bayes classification to detect one or more vibration modes, and
responsively updates a current state of a vibration mode state machine, wherein:
a residence time, severity level, and path information are associated with the current state of the downhole vibration mode state machine, the residence time is a counter or indication of the time the current state has been active,
the downhole processor operates on the axial acceleration signals for the naïve-Bayes classification,
the naïve Bayes classification detects a presence or absence of each of the vibration modes independent of any others of the one or more vibration modes if there are any, and
each of the classification of vibration modes of the naïve-Bayes classification are pre-programmed before employing the naïve-Bayes classification;
an uphole module coupled to the rig or other deployment device, wherein the uphole module:
receives, with employment of mud pulse telemetry, a representation of the current state of the downhole vibration mode state machine from the downhole processor, and
reconstructs the current state of the downhole vibration mode state machine from the representations of the current state of the downhole vibration mode state machine to determine at least a primary vibration mode and severity, wherein the at least one controllable drilling parameter is modified based on the reconstructed current state of the downhole vibration mode state machine by the uphole module.

13. The system of claim 12, wherein the at least one controllable drilling parameter comprises: a weight on bit, a bit rotation rate, a drill string rotation rate, a torque, a rate of penetration, a flow rate, or a differential pressure.

14. The system of claim 12, wherein:
the uphole module tracks a history of the current state of the downhole vibration mode state machine as part of determining the primary vibration mode from the reconstructed current state of the downhole vibration mode state machine, the representation of the current state of the downhole vibration mode state machine has an associated first indicia of the primary vibration mode corresponding to when the current state of the downhole vibration mode state machine became active, and the representation of the current state of the downhole vibration mode state machine has an associated second indicia of the primary vibration mode corresponding to a time when an immediately preceding state of the downhole vibration mode state machine occurred.

15. The system of claim 12, wherein the representation of the current state of the downhole vibration mode state machine includes a severity for each of multiple vibration modes of the one or more vibration modes.

16. The system of claim 12, wherein the vibration-related signals comprise multi-axial acceleration signals.

17. The system of claim 16, wherein as part of the operating on the axial acceleration signal of the vibration-related signals, the downhole processor derives a multi-axial jerk signal from the multi-axial acceleration signals.

18. The system of claim 12, wherein the vibration mode state machine includes at least one state for each of the following vibration modes: stick-slip, bit bounce, bit whirl, bottomhole assembly (BHA) whirl, lateral shocks, torsional resonance, parametric resonance, and bit chatter.

19. The drilling system of claim 12, wherein:
the axial acceleration signals include multi-axial acceleration signals, and
the downhole processor is configured to derive a multi-axial jerk signal from the multi-axial acceleration signals and configured to use the naïve Bayes classification to detect the presence or absence of the one or more vibration modes independent of other vibration modes.

* * * * *